Nov. 26, 1957     F. W. CISLAK     2,814,156
SIMULATED MOTOR VEHICLE STEERING AND CONTROL UNIT
Filed Nov. 22, 1955
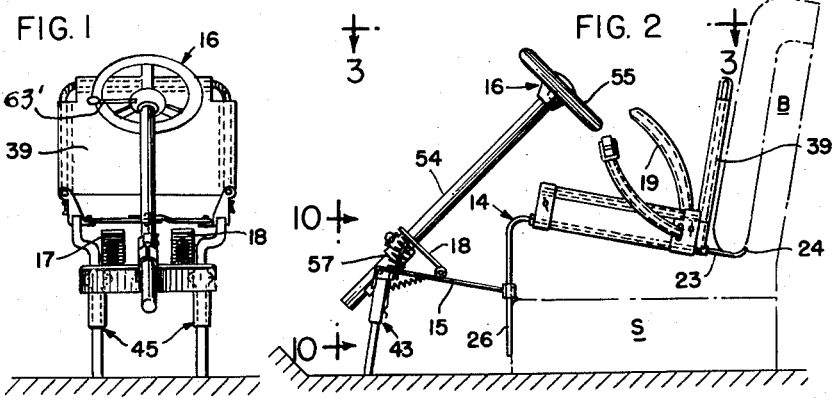
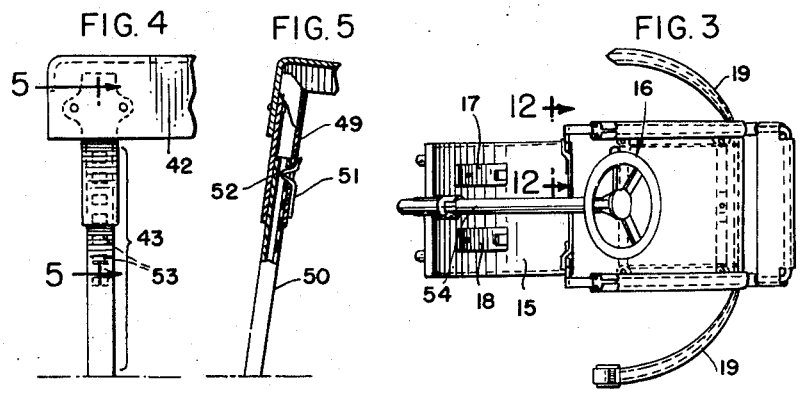
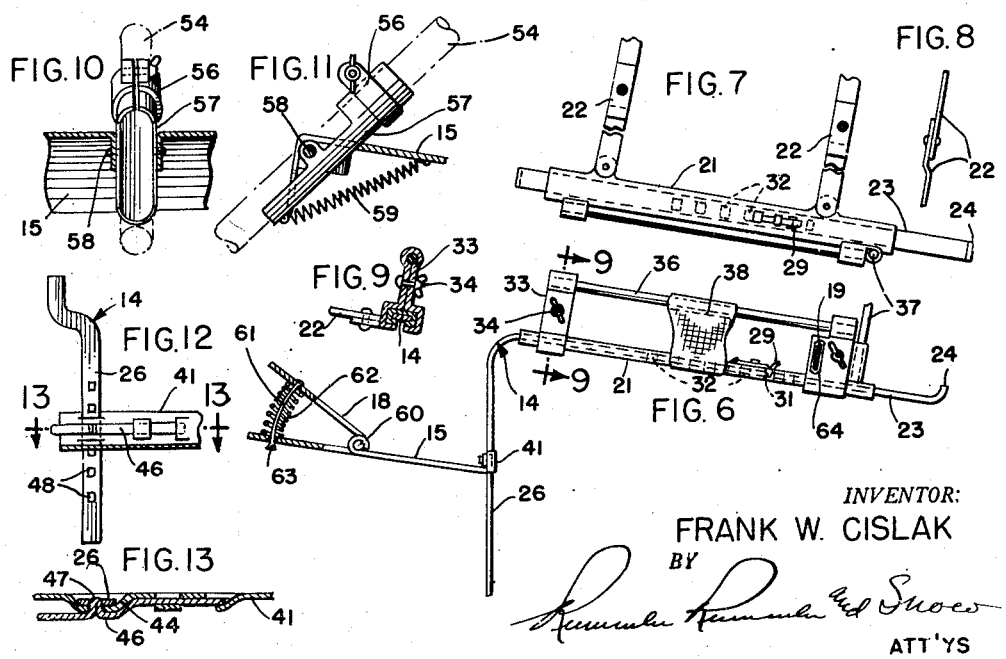
INVENTOR:
FRANK W. CISLAK
BY
ATT'YS

United States Patent Office 2,814,156
Patented Nov. 26, 1957

2,814,156

SIMULATED MOTOR VEHICLE STEERING AND CONTROL UNIT

Frank W. Cislak, Chicago, Ill.

Application November 22, 1955, Serial No. 548,313

5 Claims. (Cl. 46—1)

As is well known children, riding in motor vehicles, greatly yearn to be doing with their hands and feet what they observe the adult beside them to be doing.

The main objects of this invention, therefore, are to provide an improved form and arrangement of a simulated motor-vehicle steering and control unit for the use of a child to imitate the actions of the adult operating the vehicle in which they are riding; to provide an improved form of unit of this kind which embodies simulated brake and accelerator pedals as well as the simulated steering wheel and gear shift; to provide an improved mounting of the unit to permit its ready positioning on the front seat of a vehicle; to provide improved means for adjusting the simulated steering and control parts on the mounting; to provide improved means for securing the child in position relative to the unit; and to provide an improved unit of this kind so simple in construction as to make its manufacture very economical and its positioning on the vehicle most facile.

In the embodiment shown in the accompanying drawings:

Figure 1 is a front view of a simulated steering and control unit constructed in accordance with this invention;

Fig. 2 is a side elevation of the same in position on a motor vehicle seat;

Fig. 3 is a plan view of the unit as shown in Fig. 1;

Fig. 4 is an enlarged, fragmentary, front section of one of the adjustable leg supports for the platform;

Fig. 5 is a sectional view of the adjustable platform leg taken on the plane of the line 5—5 of Fig. 4;

Fig. 6 is an enlarged, side elevation of the mounting showing the child's seat and platform thereon;

Fig. 7 is a partial plan view of the same;

Fig. 8 is a fragmentary detail of one of the cross braces on the mounting;

Fig. 9 is a sectional detail taken on the plane of the line 9—9 of Fig. 6;

Fig. 10 is an enlarged fragmentary detail of one of the cross braces of the mounting.

Fig. 11 is a side elevation of the portion shown in Fig. 10.

Fig. 12 is an enlarged, fragmentary detail taken on the plane of the line 12—12 of Fig. 3; and Fig. 13 is a transverse section of the portion shown in Fig. 12, as viewed from the plane of the line 13—13 of Fig. 12.

The essential concept of this invention involves an adjustable mounting shaped to fit over the top and front of a motor-vehicle seat, the mounting having a forwardly-extending, leg-supported platform adjustably arranged whereon is hinged a rearwardly and upwardly-inclined, simulated steering post and wheel and a pair of laterally-spaced, simulated, spring-retracted pedals, the mounting having secured adjacent its rear top part a belt for fastening around the child.

A simulated motor-vehicle steering and control unit embodying the foregoing concept comprises a mounting 14, a platform 15, steering wheel and control lever 16, control pedals 17 and 18, and an attaching belt 19.

The mounting 14 here is shown in the form of a pair of L-shaped straps on which are adjustably arranged supports 21, for the child's seat connected by cross braces 22. The longer or stem parts 23 of these L-shaped mounting straps are adapted to rest on the horizontal portion of the vehicle seat S with the upturned rear ends 24 fitting under and around the bottom of the seat back B. The parts 26 of these L-shaped straps, extending transversely to the longer or stem 23 parts of these mounting straps, thus will be disposed vertically along the front of the seat S, as so clearly shown in Fig. 2.

The seat supports 21 are slidable on the stem parts 23 of the mounting straps and adjustably retained in position by spring clips 29 secured to the respective straps so that the offsets 31 seat in notches 32 formed in the respective mounting straps.

Two-piece brackets 33, by means of wing-nut 34, are clamped adjacent opposite ends of the supports 21 and are spanned by rods 36. The rear brackets 33 seat the ends of a U-shaped rod frame 37 forming the back of the child's seat. Conventional duck canvas strips 38 span the space between the supports 21 and the rods 36 to form the sides of the child's seat. Similar ducking 39 spans the frame 37.

The platform 15 here is shown in the form of a rectangular plate with oppositely-disposed flanges 41 and 42 along the rear and front edges. These flanges 41 and 42 are respectively adjustably secured to the transverse or vertical parts 26 of the mounting straps and to the adjustable legs 43.

The platform flange 41 is offset at 44 (Figs. 12 and 13) to receive the transverse or vertical parts 26 of the mounting straps. The platform is thereby held in an adjustable position on these mounting straps by spring clips 46 secured to the flange 41, as clearly shown in Figs. 12 and 13, so that the offset ends 47 seat in the notches 48 formed in the vertical parts 26 of the mounting straps.

The platform-supporting legs 43, as here shown, consist of two telescoping parts 49 and 50, the former of which is riveted, or otherwise bonded, to the inner face of the platform front flange 42 adjacent the corners thereof. (See Figs. 4 and 5.) A spring clip 51 is secured to the leg part 49 (see Fig. 5) so that the upset end 52, extending through a slot in the leg part 49, is seated in notches 53 in the leg part 50.

The steering wheel 16 comprises a tubular support 54 which mounts an annular hand grip 55 at its upper end and adjacent its lower end is adjustably secured, by a clamp 56, in a sheathing bracket 57 hinged at 58 to the front center part of the platform 15 (see Figs. 10 and 11). A spring 59, connected to the under side of the platform 15 and to the bracket 57 below the hinge 58, normally swings the steering wheel upwardly away from the vehicle seat S toward a nearly vertical position.

On the hand grip 55 is secured a rod 63' extending radially outward therefrom under the hand grip 55, to simulate a gear shift lever.

The pedals 17 and 18 here are shown hinged at 60 to the platform 15 intermediate the front and rear edges thereof and on opposite sides of the steering wheel post 54. On the under side of each pedal is secured a downwardly-extending curved rod 61 embraced by a compression spring 62. The lower end of the rod 61 extends through an aperture in the platform 15 and the end of the rod is split at 63 (Fig. 6) to secure it against withdrawal through the platform aperture by the action of the spring 62. A nut threaded onto the end of the rod 61 would effect the same result.

The belt 19, of conventional material and form is threaded through holes 64 in the rear brackets 37 so as to extend upwardly and around the child and hold it in place on the vehicle seat S. In most instances cushions of suitable character would be placed on the mounting 14 and against the back frame 37 to better position the child in comfortable reach of the hand grip 55 of the steering wheel 16.

It is quite obvious from the foregoing description, that this simulated motor-vehicle steering and control unit is very easily and safely positioned on a motor-vehicle seat S. Moreover, the child's seat supports 21 and the platform 15 are adjustable on the mounting 14 so as to dispose the hand grip 55 and the pedals 17 and 18 in easy reach of the child.

When the child is not in its seat and/or when it does not have hold of the hand grip 55, the spring 59 swings the steering wheel 16 into a nearly vertical position thereby making more convenient the placing of the child in the seat or its removal therefrom.

I claim:

1. A simulated motor-vehicle steering and control unit comprising, a one-pieice, L-shaped mounting formed so that one part overlays a vehicle seat and disposes the other transverse part vertically against the seat front, a forwardly-extending platform secured to the transverse mounting part, a steering wheel post having a steering wheel fixed to the upper end normal to the post axis, the post being hingedly affixed to the platform and spring-biased toward a substantially vertically-disposed position, and a spring-retracted pedal hinged to the platform adjacent the steering wheel post.

2. A simulated motor-vehicle steering and control unit comprising, a one-piece L-shaped mounting formed so that one part overlays a vehicle seat and disposes the other transverse part vertically against the seat front, a forwardly-extending platform vertically slidable on the transverse mounting part, spring biased means for locking the platform in any of several vertical positions on the transverse mounting part, a steering wheel post having a steering wheel fixed to the upper end normal to the post axis, the post being affixed to the platform, spring-retracted pedals hinged to the platform at opposite sides of the steering wheel post, two-piece telescoping legs attached to the forward corners of the platform, and spring-biased means for locking the adjustable leg pieces to coordinate with the positioning of the platform on the mounting and thereby dispose the legs to rest on the vehicle foot-board and afford supplemental support for the platform.

3. A simulated motor-vehicle steering and control unit comprising, a mounting consisting of a pair of parallel transversely-braced one-piece L-shaped members each formed so that one part overlays a vehicle seat and disposes the respective other transverse parts of the members vertically against the seat front, the outer ends of each of the members being upturned to fit under and behind the seat back to anchor the mounting on the seat, a seat support arranged on each of the members for sliding adjustment longitudinally on the members, side rods and a back frame secured to the seat supports to form a seat on and above the members, a forwardly-extending platform vertically slidable on the transverse parts of the members, spring-biased means for locking the platform in any of several vertical positions on to the transverse parts of the members, a steering wheel post having a steering wheel fixed to the upper end normal to the post axis, the post being hingedly affixed to the platform and spring-biased toward a substantially vertically-disposed position, spring-retracted pedals hinged to the platform adjacent the steering wheel, two-piece telescoping legs attached to the forward corners of the platform, spring-biased means for locking the adjustable leg pieces to dispose the legs to rest on the vehicle foot-board to afford additional support for the platform, and an adjustable retaining belt secured to the mounting members to secure a child on the seat.

4. A simulated motor-vehicle steering and control unit comprising, a one-piece L-shaped mounting formed so that one part overlays a vehicle seat and disposes the other transverse part vertically against the seat front, a forwardly extending platform vertically slidable on the transverse mounting part, spring-biased means for locking the platform in any of several vertical positions on the transverse mounting part, a steering-wheel post having a steering wheel fixed to the upper end normal to the post axis, the post being axially adjustable relative to the platform, means for fixing the axial positioning of the post on the platform, spring-retracted pedals hinged to the platform at opposite sides of the steering-wheel post, two-piece telescoping leg pieces attached to the forward corners of the platform, and spring-biased means for locking the adjustable leg pieces to coordinate with the positioning of the platform on the mounting and thereby dispose the legs to rest on the vehicle footboard and afford additional support for the platform.

5. A simulated motor vehicle steering and control unit comprising, a mounting consisting of a pair of parallel transversely-braced one piece L-shaped members each formed so that one post overlays a vehicle seat and disposes the respective other transverse parts of the members vertically against the seat front, a seat support arranged on the one part of each of the members for sliding adjustment longitudinally of the members, side rods and a back frame secured to the seat supports to form a seat on and above the members, a forwardly-extending platform vertically slidable on the transverse vertical parts of the members, spring-biased means for locking the platform in any of several vertical positions on the transverse vertical parts of the members, a steering wheel post having a steering wheel fixed to the upper end normal to the post axis, the post being hingedly affixed to the platform and spring-biased toward a substantially vertically disposed position, spring-retracted pedals hinged to the platform adjacent the steering wheel, two-piece telescoping legs attached to the forward corners of the platform, the spring-biased means for positioning the leg pieces to dispose the legs to rest on the vehicle foot board to afford additional support for the platform.

References Cited in the file of this patent

UNITED STATES PATENTS

| | | |
|---|---|---|
| D. 147,884 | Bitter | Nov. 18, 1947 |
| 1,922,746 | Reeder | Aug. 15, 1933 |
| 2,128,435 | Shippee | Aug. 30, 1938 |
| 2,322,403 | Kieft | June 22, 1943 |
| 2,362,111 | Burns | Nov. 7, 1944 |
| 2,725,922 | Smith | Dec. 6, 1955 |